United States Patent
Close

[11] 3,865,348
[45] Feb. 11, 1975

[54] WEED PULLER
[76] Inventor: Olive H. Close, 9375 Alta Loma Dr., Alta Loma, Calif. 91701
[22] Filed: Jan. 28, 1974
[21] Appl. No.: 437,362

[52] U.S. Cl. .............................................. 254/132
[51] Int. Cl. .............................................. B66f 3/00
[58] Field of Search ............... 254/131.5, 132, 120; 294/49

[56] References Cited
UNITED STATES PATENTS
| 146,825 | 1/1874 | Heacock | 254/132 |
|---|---|---|---|
| 1,724,026 | 8/1929 | Joseph | 254/132 |
| 2,716,538 | 8/1955 | Arrowood | 254/131.5 |
| 3,288,437 | 11/1966 | Pederson | 254/132 |
| D191,619 | 10/1961 | Grahovac | 254/132 |

FOREIGN PATENTS OR APPLICATIONS
| 593,351 | 10/1947 | Great Britain | 254/132 |

Primary Examiner—Othell M. Simpson
Attorney, Agent, or Firm—Robert H. Eckhoff

[57] ABSTRACT

A weed pulling device which is of a simple and rugged construction and yet which can be manipulated readily and with little effort to remove a plant in the earth.

1 Claim, 4 Drawing Figures

WEED PULLER

BACKGROUND OF THE INVENTION

While various devices have been proposed heretofore for the removal of weeds, these are generally dependent upon a cutting action for achieving the desired end result.

SUMMARY OF THE INVENTION

It is in general the broad object of the present invention to provide a simple, improved and rugged device which can be readily manipulated when engaged with a weed to provide a force enabling the root of the weed to be removed from the earth in which the weed is growning.

DESCRIPTION OF THE PREFERRED EMBODIMENT

Figure 1:
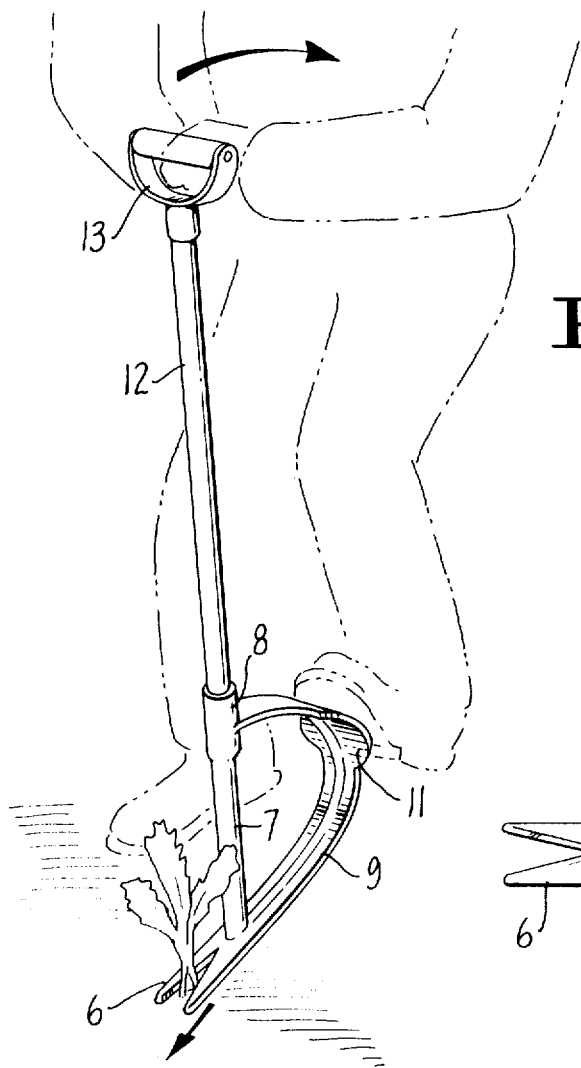
FIGURE 1 is a perspective view showing the device of the present invention being manipulated to remove a plant from the earth.
Figure 3:
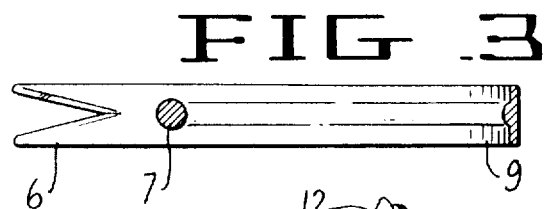
FIGURE 3 and 4, respectively, are sections taken along the lines 3—3 and 4—4 of Figure 3.
Figure 2:
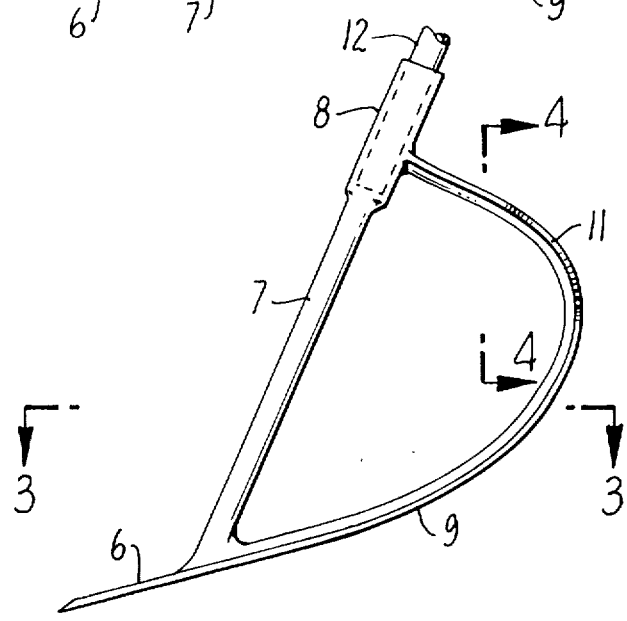
FIGURE 2 is a side elevation of a portion of the device.
Figure 4:
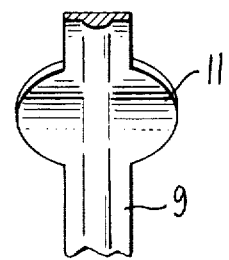

The device of the present invention comprises a forwardly extending notched straight end pry portion 6 having a substantially straight post portion or tubular post 7 extending upwardly therefrom and joined adjacent its upper end 8 with a curved portion 9 which extends upwards as an extension of the pry portion 6. The tubular post 7 is preferably made of steel and is enlarged at it upper end 8 to receive a wooden shaft 12 (Figure 2) which carries handle 13. Intermediate the ends of the curved portion 9, I provide a pad 11 to be engaged with the foot of an operator.

In use, the notched pry portion 6 is engaged with the plant to be removed. In the case of a clump of grass or weeds, the pry is inserted in the middle of the clump. The operator then places his foot against the pad 11 and then pulls upon the handle 13 to rock the structure toward the operator whereby the curved portion 9 enables an increased leverage to be exerted upon the plant or clump of grass or weeds to be removed. Utilization of the wooded shaft 12 enables the weight of the device to be reduced. Thus the plant can be removed with such ease that no excessive exertion or stooping is necessary.

I claim:

1. A weed puller, comprising: an elongate, substantially straight post portion; an arcuately curved portion having a first end joined to one end of the post portion and extending laterally therefrom and curving inwardly toward the post portion and extending substan- tially straight at its other end beyond the other end of the post portion and joined to said other end of the post portion at an angle relative to the axis of the post portion and having a notch in the end thereof for engagement with a weed; laterally enlarged foot pad means on the curved portion between the ends thereof to aid in position- ing the notched end relative to a weed; and an elongated handle extending axially from said one end of the post portion whereby the notched end may be engaged with a weed and the puller then rocked rearwardly upon the curved portion thereof to pull the weed.

* * * * *